(12) United States Patent
Fukuchi et al.

(10) Patent No.: US 8,953,035 B2
(45) Date of Patent: *Feb. 10, 2015

(54) PARTICLE IMAGE VELOCIMETRY METHOD, PARTICLE IMAGE VELOCIMETRY METHOD FOR 3-DIMENSIONAL SPACE, PARTICLE IMAGE VELOCIMETRY SYSTEM, AND TRACER PARTICLE GENERATING DEVICE IN PARTICLE IMAGE VELOCIMETRY SYSTEM

(75) Inventors: Yuichi Fukuchi, Wako (JP); Takashi Yoshino, Wako (JP); Minoru Teramura, Wako (JP); Gensuke Hoshino, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 486 days.

This patent is subject to a terminal disclaimer.

(21) Appl. No.: 13/381,244

(22) PCT Filed: Jul. 5, 2010

(86) PCT No.: PCT/JP2010/061374
§ 371 (c)(1),
(2), (4) Date: Dec. 28, 2011

(87) PCT Pub. No.: WO2011/004783
PCT Pub. Date: Jan. 13, 2011

(65) Prior Publication Data
US 2012/0105628 A1     May 3, 2012

(30) Foreign Application Priority Data

Jul. 8, 2009 (JP) ................. 2009-162114
Jul. 8, 2009 (JP) ................. 2009-162115
Jul. 8, 2009 (JP) ................. 2009-162116
Jul. 8, 2009 (JP) ................. 2009-162117

(51) Int. Cl.
*G01P 5/22* (2006.01)
*G01P 5/26* (2006.01)
(Continued)

(52) U.S. Cl.
CPC ............... *G01M 9/067* (2013.01); *G01P 5/001* (2013.01); *G01P 5/22* (2013.01); *G01P 5/26* (2013.01); *G01S 17/58* (2013.01)

USPC ............................. 348/135; 356/28; 356/335

(58) Field of Classification Search
USPC ................................... 356/335–343
See application file for complete search history.

(56) References Cited

U.S. PATENT DOCUMENTS 4,783,008 A    11/1988   Ikeuchi et al.
5,272,333 A *   12/1993   Fagan et al. ............. 250/227.16
(Continued)

FOREIGN PATENT DOCUMENTS

DE       4237440       3/1994
DE      19928698       9/2000
(Continued)

OTHER PUBLICATIONS

Bastiaans, "Croos-correlation PIV: Theory, implementation and accuracy," Technical University of Eindhoven, EUT Report 99-W-001, ISBN: 90-386-2851-X, 2000, pp. 1-35.*

(Continued)

*Primary Examiner* — Jay Au Patel
*Assistant Examiner* — Reza Aghevli
(74) *Attorney, Agent, or Firm* — Rankin, Hill & Clark LLP

(57) ABSTRACT

A particle image velocimetry system is provided which supplies tracer particles to a flow field around an object (12) from tracer particle supply means, takes an image of reflected light by imaging means (32A, 32B) by irradiating the tracer particles twice with laser light at different times, and determines a velocity vector of the flow field based on the two images obtained of the tracer particles. The two images are each divided into a plurality of test regions, and when first peak value (fp)/second peak value (sp)≥1.2 is satisfied by comparison between a first peak value fp and a second peak value sp of a cross-correlation value of a luminance pattern of tracer particles in each test region of the two images, it is determined that the reliability of the velocity vector is high. Thus, it is possible to enhance the precision of measurement of the state of flow by reliably determining erroneous vectors.

8 Claims, 14 Drawing Sheets

(51) Int. Cl.
*G01M 9/06* (2006.01)
*G01P 5/00* (2006.01)
*G01S 17/58* (2006.01)

(56) References Cited

U.S. PATENT DOCUMENTS

| | | | |
|---|---|---|---|
| 5,440,144 | A | 8/1995 | Raffel et al. |
| 5,488,224 | A * | 1/1996 | Fagan et al. ............... 250/227.16 |
| 2007/0272007 | A1 * | 11/2007 | Mori et al. .................. 73/170.11 |
| 2008/0137992 | A1 * | 6/2008 | Mori et al. ..................... 382/312 |
| 2009/0092284 | A1 * | 4/2009 | Breed et al. .................... 382/103 |

FOREIGN PATENT DOCUMENTS

| | | |
|---|---|---|
| GB | 2352033 | 1/2001 |
| JP | 61202134 | 9/1986 |
| JP | 63-085326 | 4/1988 |
| JP | 5-297014 | 11/1993 |
| JP | 06-094740 | 4/1994 |
| JP | 10-019919 | 1/1998 |
| JP | 2001-074415 | 3/2001 |
| JP | 2002126587 | 5/2002 |
| JP | 2004-286733 | 10/2004 |
| JP | 2004304662 | 10/2004 |
| JP | 2007212350 | 8/2007 |
| JP | 2008-140103 | 6/2008 |
| JP | 2008-180630 | 8/2008 |

OTHER PUBLICATIONS

Wernet et al., "Development and Application of a MHz Frame Rate Digital Particle Velocimetry System," Jour. of American Institute of Aeronautics and Astronautics, May 5, 2004, pp. 1-10.*

Lee et al, "Three-dimensional Measurement of Fluid Flow by Stereoscopic Tracking Velocimetry," Optical Technology and Image Processing for Fluids and Solids Diagnostics, SPIE-Beijing 2002, vol. 12, pp. 1-12.*

Adrian, "Twenty Years of Particle Image Velocimetry," Experiments in Fluids, 2005, vol. 39, pp. 159-169.*

"Development and Application of a MHz Frame Rate Digital Particle Image Velocimetry System", Mark P. Wernet; Anthony B. Opalski, American Institute of Aeronautics and Astronautics, 10 Pages [English text].

"Cross-correlation PIV; theory, implementation and accuracy", Rob J.M. Bastiaans, Department of Mechanical Engineering, Section of Internal Combustion Engines, Eindhoven University of Technology, 39 Pages [English text].

* cited by examiner

PARTICLE IMAGE VELOCIMETRY METHOD, PARTICLE IMAGE VELOCIMETRY METHOD FOR 3-DIMENSIONAL SPACE, PARTICLE IMAGE VELOCIMETRY SYSTEM, AND TRACER PARTICLE GENERATING DEVICE IN PARTICLE IMAGE VELOCIMETRY SYSTEM

The present invention relates to a particle image velocimetry method that involves supplying tracer particles to a flow field around an object from tracer particle supply means, taking an image of reflected light by imaging means by irradiating the tracer particles twice with laser light at different times, and determining a velocity vector of the flow field based on the two images obtained of the tracer particles.

The present invention relates to a particle image velocimetry method for three dimensional space that involves irradiating tracer particles contained in a steady flow flowing around an object with a two-dimensional laser sheet at two times spaced by a very small period of time, taking an image of irradiated tracer particles by a camera from two directions that intersect the laser sheet, and measuring two in-plane velocity components of tracer particles within the laser sheet and one out-of-plane velocity component that is perpendicular to the laser sheet based on the obtained images at the two times, and a particle image velocimetry system for three dimensional space for carrying out the method.

Further, the present invention relates to a particle image velocimetry system in which tracer particles contained in a flow field around an object are irradiated with laser light having a predetermined wavelength, an image of reflected light is taken by imaging means, and the flow velocity of the flow field is measured based on the image obtained of the tracer particles, Further, the present invention relates to a tracer particle generating device in a particle image velocimetry system for supplying tracer particles formed from fine liquid particles from tracer particle supply means to a flow field around an object, taking images of reflected light with imaging means by irradiating the tracer particles with laser light, and measuring the state of the flow field based on the images obtained of the tracer particles.

BACKGROUND ART

PIV (Particle Image Velocimetry), in which the flow field of a fluid containing tracer particles is irradiated with a two-dimensional laser sheet at a time t1 and at a time t1+Δt, an image of the tracer particles within the laser sheet at each of these times is taken by a camera, and the velocity of the tracer particles within the laser sheet is determined based on the difference in luminance pattern of the tracer particles between the images at these two times, is known.

In such a particle image velocimetry system, it is desirable to take an image of only light reflected from the tracer particles contained in the fluid, but in reality since it is inevitable that images of noise components such as halation, light reflected from an object placed in the fluid, and light reflected from dirt attached to an observation window of a wind tunnel are taken together with that of light reflected from the tracer particles, there is a possibility that, when the velocity vector of the fluid is calculated from the camera images, an erroneous velocity vector (erroneous vector) will be calculated.

An arrangement in which, in order to minimize the above calculation of an erroneous vector, an image of only light reflected from the tracer particles is obtained by removing as noise from an original image the time-average luminance value of each pixel of the image or the minimum luminance value among a plurality of images taken at different times, is known from Patent Document 1 below.

Furthermore, an arrangement in which an image of only tracer particles is left by filtering spatial frequency components from gray-scale images at two consecutive times of the camera by means of a high pass filter and a low pass filter, thus obtaining the maximum travel distance of the gray-scale images at the two times with good precision, is known from Patent Document 2 below.

Moreover, as a particle image velocimetry system, an arrangement in which a space having floating tracer particles is irradiated with two two-dimensional laser sheets that are parallel to each other and have different wavelengths, images of tracer particles present within the laser sheets are taken by two cameras placed in directions perpendicular to the laser sheets, and by comparing the luminance patterns of the tracer particles of the two images obtained, three velocity components containing velocity components in the X direction and the Y direction within the plane of the laser sheet (in-plane velocity components) and a velocity component in the Z direction perpendicular to the laser sheet (out-of-plane velocity component) are determined is known from Patent Document 3 below.

Similarly, as a particle image velocimetry system, a so-called stereo PIV in which a three dimensional velocity field is irradiated with one laser sheet, images of tracer particles present within the laser sheet are taken at two times by two cameras from two different directions with respect to the plane of the laser sheet, and three velocity components, that is, in-plane velocity components and an out-of-plane velocity component, are obtained by comparing luminance patterns of the tracer particles of the two images obtained is known from Patent Document 4 below.

Furthermore, when an image of tracer particles irradiated with the laser sheet is taken by imaging means, if an image of reflected light that has been reflected from an object as a background therefor is taken by the imaging means together with reflected light that has been reflected from the tracer particles, the reflected light from the object becomes noise to thus decrease the S/N ratio of the reflected light, thus causing the problem that the measurement precision for the flow velocity is degraded.

In order to solve this problem, an arrangement in which fluorescence generated by employing laser light as excitation light is generated by impregnating tracer particles, which are solid particles of silica ($SiO_2$), with a fluorescent material, and an image of the tracer particles is taken via a filter that only passes the wavelength of this fluorescence to thus block reflected light that has been reflected from an object as a background, thereby obtaining a clear image of the tracer particles, is known from Patent Document 5 below.

Furthermore, an arrangement in which a Laskin nozzle is used as a tracer particle generating device of a particle image velocimetry system is known from Non-Patent Document 1 below. In this tracer particle generating device, compressed air is supplied via a Laskin nozzle disposed in an oil stored in a pressure vessel, thus generating air bubbles containing oil droplets, and the air bubbles burst on the liquid surface of the oil to thus make the generated oil droplets collide with a collision plate, thus making the particle size uniform, after which they are supplied as tracer particles.

Patent Document 1: Japanese Patent Application Laid-open No. 2001-74415

Patent Document 2: Japanese Patent Application Laid-open No. 2008-140103

Patent Document 3: Japanese Patent Application Laid-open No. 10-19919
Patent Document 4: Japanese Patent Application Laid-open No. 2004-286733
Patent Document 5: Japanese Patent Application Laid-open No. 5-297014
Non-Patent Document 1: PIV Handbook, Ed. by The Visualization Society of Japan, Morikita Publishing Co., Ltd.

DISCLOSURE OF INVENTION

Problems to be Solved by the Invention

However, with regard to the arrangements described in Patent Documents 1 and 2 above, although some degree of effect can be anticipated in excluding erroneous vectors, there is still room for further improvement of the precision with which erroneous vectors are excluded.

Furthermore, with regard to the arrangement described in Patent Document 3 above, there is a problem with the structure being complicated due to the necessity of irradiation with two laser sheets having different wavelengths, whereas the arrangement described in Patent Document 4 above has the advantage that three velocity components of a velocity field can be measured merely by irradiation with one laser sheet.

However, in all of the above-mentioned arrangements, although it is possible to measure three velocity components within one plane of a velocity field irradiated with a laser sheet, it is impossible to measure three velocity components of a velocity field of a three dimensional space around an object.

Furthermore, in the arrangement described in Patent Document 5 above, since the tracer particles are impregnated with a fluorescent material, the ability to follow the flow of a fluid is degraded due to an increase in the weight of the tracer particles, and there is the problem that the precision of measurement is degraded. Moreover, rhodamine and cadmium, which are cited as fluorescent materials, are toxic toward the human body, and there is a possibility that the tracer particles impregnated therewith will float in the air and be inhaled into the human body.

Moreover, in order to obtain a clear image of tracer particles, it is necessary to increase the ratio (S/N ratio) of the intensity of light reflected from the tracer particles as the signal and the intensity of light reflected from the background as the noise, and for that reason the particle size of the tracer particles is desirably uniform and large. However, if the particle size of the tracer particles increases excessively, due to the large weight thereof they become highly susceptible to gravity or inertial force, and there is the problem that the ability of the tracer particles to follow a flow field is degraded.

Furthermore, in the arrangement described in Non-Patent Document 1 above, the average particle size (arithmetic average) of the tracer particles is on the order of 1 μm, which is smaller than the optimum value, and there is the problem that the intensity of light reflected from the tracer particles is insufficient and the S/N ratio becomes small.

The present invention has been accomplished in light of the above-mentioned circumstances, and it is a first object thereof to determine erroneous vectors with good precision by utilizing a peak value of the degree of correlation between luminance patterns of two images in a particle image velocimetry method.

Moreover, it is a second object of the present invention to measure three velocity components of a velocity field of a three dimensional space around an object using stereo PIV.

Furthermore, it is a third object of the present invention to enhance the precision of measurement in a particle image velocimetry system without impairing the ability of tracer particles to follow a flow field while avoiding any adverse effects on the health of the human body.

Moreover, it is a fourth object of the present invention to provide a tracer particle generating device for a particle image velocimetry system that enables tracer particles having an appropriate and uniform particle size to be generated.

Means for Solving the Problems

In order to attain the above-described first object, according to a first aspect of the present invention, there is proposed a particle image velocimetry method that involves supplying tracer particles to a flow field around an object from tracer particle supply means, taking an image of reflected light by imaging means by irradiating the tracer particles twice with laser light at different times, and determining a velocity vector of the flow field based on the two images obtained of the tracer particles, characterized in that the two images are each divided into a plurality of test regions, and the reliability of the velocity vector is determined by comparison between a first peak value and a second peak value of a cross-correlation value of a luminance pattern of tracer particles in each test region of the two images.

Furthermore, according to a second aspect of the present invention, in addition to the first aspect, there is proposed the particle image velocimetry method, wherein when first peak value/second peak value$\geq 1.2$ is satisfied, it is determined that the reliability of the velocity vector is high.

In order to attain the above-described second object, according to a third aspect of the present invention, there is proposed a particle image velocimetry method for three dimensional space that involves irradiating tracer particles contained in a flow field around an object with a two-dimensional laser sheet at two times spaced by a very small period of time, taking an image of irradiated tracer particles by imaging means from two directions that intersect the laser sheet, and measuring two in-plane velocity components of tracer particles within the laser sheet and one out-of-plane velocity component that is perpendicular to the laser sheet based on the obtained images at the two times, characterized in that the method comprises a step of acquiring the three velocity components within a plurality of planes that are spaced in a direction perpendicular to the laser sheet, and a step of measuring the velocity field of the three velocity components in three dimensional space by stacking the three velocity components within the plurality of planes using the flow as a steady flow.

Furthermore, according to a fourth aspect of the present invention, there is proposed the particle image velocimetry system for three dimensional space for carrying out the particle image velocimetry method for three dimensional space according to the third aspect, wherein laser sheet irradiating means and the imaging means are supported on a moving member that can be moved along a guide member disposed in a direction parallel to a laser beam generating the laser sheet, and the laser sheet irradiating means and the imaging means are moved while maintaining a fixed positional relationship.

Further, according to a fifth aspect of the present invention, in addition to the fourth aspect, there is proposed the particle image velocimetry system for three dimensional space, further comprising, fixed outside the movement means, a laser head that emits the laser beam in a direction parallel to the direction of movement of the movement means, the laser sheet irradiating means converting the laser beam into the laser sheet.

In order to attain the above-described third object, according to a sixth aspect of the present invention, there is proposed a particle image velocimetry system in which tracer particles contained in a flow field around an object are irradiated with laser light having a predetermined wavelength, an image of reflected light is taken by imaging means, and the flow velocity of the flow field is measured based on the image obtained of the tracer particles, characterized in that the object has a fluorescent surface that changes the wavelength of incoming laser light and reflects the laser light, and the imaging means takes an image of light reflected from the tracer particles through a filter that selectively passes the predetermined wavelength.

Moreover, according to a seventh aspect of the present invention, in addition to the six aspect, there is proposed the particle image velocimetry system, wherein the surface of the object is a smooth glossy surface.

In order to attain the above-described fourth object, according to an eighth aspect of the present invention, there is proposed a tracer particle generating device in a particle image velocimetry system, the particle image velocimetry system being configured such that it supplies tracer particles formed from fine oil particles from tracer particle supply means to a flow field around an object, takes an image of reflected light with imaging means by irradiating the tracer particles twice with laser light, and measures the state of the flow field based on the images obtained of the tracer particles, characterized in that the tracer particle supply means comprises an impinging jet type nozzle having two spray nozzles with axes thereof intersecting each other, the spray nozzle surrounding a periphery of an oil issuing opening that issues oil with an air issuing opening that issues air, a compressed air supply source for supplying compressed air, an oil tank for storing oil, a first air passage for pressurizing oil by supplying air of the compressed air supply source to the oil tank, an oil passage for supplying pressurized oil of the oil tank to two oil issuing openings of the impinging jet type nozzle, and a second air passage for supplying air of the compressed air supply source to two air issuing openings of the impinging jet type nozzle.

Moreover, according to a ninth aspect of the present invention, in addition to the eighth aspect, there is proposed the tracer particle generating device in a particle image velocimetry system, further comprising first pressure regulating means provided in at least one of the first air passage and the oil passage, a first pressure sensor provided downstream of the first pressure regulating means, second pressure regulating means provided in the second air passage, a second pressure sensor provided downstream of the second pressure regulating means, and control means for controlling the first pressure regulating means based on a pressure detected by the first pressure sensor and controlling the second pressure regulating means based on a pressure detected by the second pressure sensor.

Here, a main guide rail 21 and an auxiliary guide rail 22 of an embodiment correspond to the guide member of the present invention, a main traverser 23 and first and second auxiliary traversers 24A and 24B of the embodiment correspond to the moving member of the present invention, first and second CCD cameras 32A and 32B of the embodiment correspond to the imaging means of the present invention, an electronic control unit 54 of the embodiment corresponds to the control means of the present invention, and one out-of-plane velocity component Vz and two in-plane velocity components Vx and Vy of the embodiment correspond to the velocity component of the present invention.

Effects of the Invention

In accordance with the first aspect of the present invention, tracer particles are supplied to the flow field around the object from the tracer particle supply means, images of reflected light are taken by the imaging means while irradiating the tracer particles with laser light twice at different times, and the velocity vector of the flow field is determined based on the two images obtained of the tracer particles. The two images are each divided into a plurality of test regions, and since the reliability of the velocity vector is determined by comparing a first peak value and a second peak value of the cross-correlation value of luminance patterns of the tracer particles in the respective test regions of the two images, it is possible to enhance the precision of measurement of the state of flow by reliably excluding erroneous vectors.

Furthermore, in accordance with the second aspect of the present invention, since it is determined that reliability of a velocity vector is high when first peak value/second peak value$\geq 1.2$ is satisfied, it is possible to enhance the precision of measurement of the state of flow by more reliably excluding erroneous vectors.

Moreover, in accordance with the third aspect of the present invention, the tracer particles contained in the flow field around the object are irradiated with a two-dimensional laser sheet at two times that are spaced by a very small amount of time, images of the irradiated tracer particles are taken by the imaging means from two directions that intersect the laser sheet, when two in-plane velocity components of the tracer particles within the laser sheet and one out-of-plane velocity component perpendicular to the laser sheet are measured based on the images obtained at the two times, after three velocity components within a plurality of planes spaced in a direction perpendicular to the laser sheet are acquired, the three velocity components within the plurality of planes are stacked with the flow as a steady flow to thus measure the velocity field of the three velocity components in the three dimensional space, and it is therefore possible to measure three velocity components of the velocity field in the three dimensional space around the object.

Moreover, in accordance with the fourth aspect of the present invention, since the laser sheet irradiating means and the imaging means are supported on the moving member that is movable along the guide member disposed in a direction parallel to the laser beam forming the laser sheet, and the laser sheet irradiating means and the imaging means are moved while maintaining a fixed positional relationship, when the position of the laser sheet is moved in order to measure the velocity field of three velocity components in three dimensional space, it becomes unnecessary to carry out a different calibration each time, thereby reducing the number of calibration steps.

Moreover, in accordance with the fifth aspect of the present invention, since the laser head that emits a laser beam in a direction parallel to the direction of movement of the movement means is fixed to other than the movement means, and the laser sheet irradiating means converts the laser beam into a laser sheet, it becomes possible to move the position of the laser sheet without mounting the laser head on the movement means, thereby contributing to a reduction in the size of the movement means and a drive source therefor.

Furthermore, in accordance with the sixth aspect of the present invention, tracer particles contained in the flow field around the object are irradiated with laser light having a predetermined wavelength, an image of reflected light is taken by the imaging means, and the flow velocity of the flow field is determined based on the image obtained of the tracer particles. Since, at that time, the fluorescent surface of the object is excited by the laser light to thus generate fluorescence having a wavelength that is different from the wavelength of the laser light, by taking an image using a filter that allows only the wavelength of reflected laser light that has been reflected from the tracer particles to pass through, the S/N ratio of the image of the tracer particles can be enhanced, the influence of the light that has been reflected from the object is removed, and the precision of measurement of the flow velocity can be enhanced. Moreover, since it is unnecessary to impart fluorescent properties to the tracer particles, it is possible to prevent the ability of the tracer particles to follow the flow field from being degraded due to an increase in their weight and also prevent any adverse effects on the human body due to diffusion of tracer particles containing a harmful fluorescent material.

Moreover, in accordance with the seventh aspect of the present invention, since laser light is specularly reflected on the smooth glossy surface at the surface of the object without being diffused, if the imaging means is disposed so that an image of reflected light that has been specularly reflected is not taken, an image of only light reflected from the tracer particles can be taken, thus further enhancing the precision of measurement of the flow velocity.

Furthermore, in accordance with the eighth aspect of the present invention, since the tracer particle supply means includes the impinging jet type nozzle in which the axes of the two spray nozzles, in which the air issuing opening that issues air surrounds the periphery of the oil issuing opening that issues oil, intersect each other, the oil is pressurized by supplying compressed air from the compressed air supply means to the oil tank via the first air passage, the oil is supplied to the two oil issuing openings of the impinging jet type nozzle via the oil passage, and compressed air is supplied from the compressed air supply means to the two air issuing openings of the impinging jet type nozzle via the second air passage, it is possible to generate tracer particles having an appropriate and uniform particle size.

Moreover, in accordance with the ninth aspect of the present invention, since the first pressure regulating means is provided in the first air passage or the oil passage, the first pressure sensor is provided on the downstream side thereof, the second pressure regulating means and the second pressure sensor are provided on the upstream side and the downstream side of the second air passage respectively, and the control means controls the first pressure regulating means based on the pressure detected by the first pressure sensor and controls the second pressure regulating means based on the pressure detected by the second pressure sensor, it is possible to freely control the particle size of the tracer particles by supplying oil and air to the oil issuing opening and the air issuing opening of the impinging jet type nozzle respectively at any pressure.

EXPLANATION OF REFERENCE NUMERALS AND SYMBOLS

Figure 1:
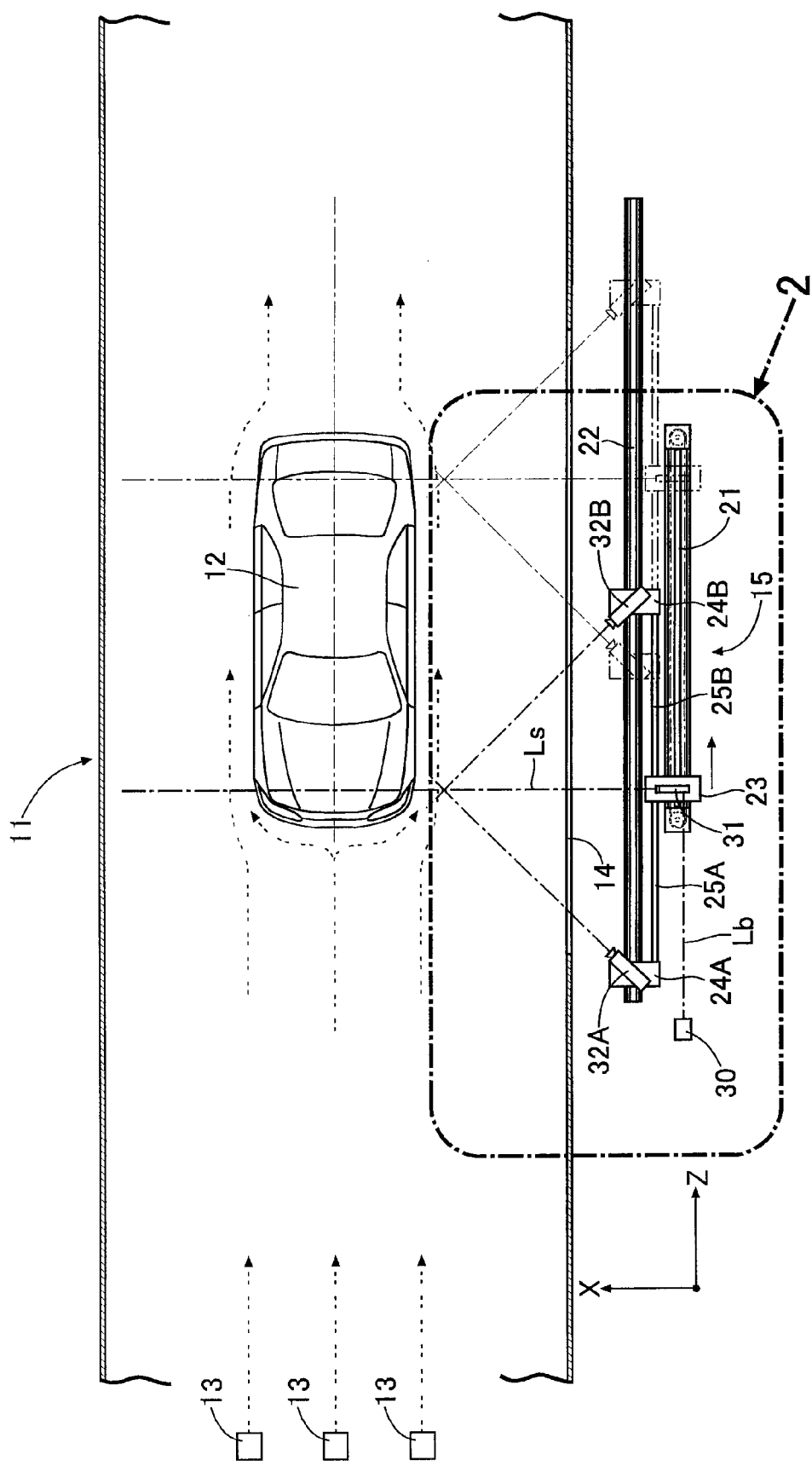
FIG. 1 is an overall plan view of a particle image velocimetry system provided in a wind tunnel. (first embodiment)

12 Object
13 Tracer particle supply means
21 Main guide rail (guide member)
22 Auxiliary guide rail (guide member)
23 Main traverser (moving member)
24A First auxiliary traverser (moving member)
24B Second auxiliary traverser (moving member)
30 Laser head
31 Laser sheet irradiating means
32A First CCD camera (imaging means)
32B Third CCD camera (imaging means)
34 Filter
41 Spray nozzle
42 Impinging jet type nozzle
43 Oil issuing opening
44 Air issuing opening
45 Compressed air supply source
46 Oil tank
47 First air passage
48 Oil passage
49 Second air passage
50 First pressure sensor
51 First pressure regulating means
52 Second pressure sensor
53 Second pressure regulating means
54 Electronic control unit (control means)
fp First peak value
sp Second peak value
Lb Laser beam
Ls Laser sheet
Vx, Vy Two in-plane velocity components (velocity component)

Vz One out-of-plane velocity component (velocity component)

BEST MODE FOR CARRYING OUT THE INVENTION

A mode for carrying out the present invention is explained below by reference to FIG. 1 to FIG. 14B.

First Embodiment

As shown in FIG. 1, an object 12 such as for example an automobile vehicle body model is placed in the interior of a wind tunnel 11 to which a uniform flow of air at a predetermined flow velocity is supplied, and fine oil droplets (tracer particles) having a diameter of a few μm are supplied into the uniform flow from tracer particle supply means 13 disposed on the upstream side of the object 12. The uniform flow changes its direction of flow along the surface of the object 12 and forms a three dimensional velocity field. A transparent observation window 14 is provided in at least part of a wall face of the wind tunnel 11, and a particle image velocimetry system 15 is disposed at a position facing the object 12 with the observation window 14 interposed therebetween.

Figure 2:
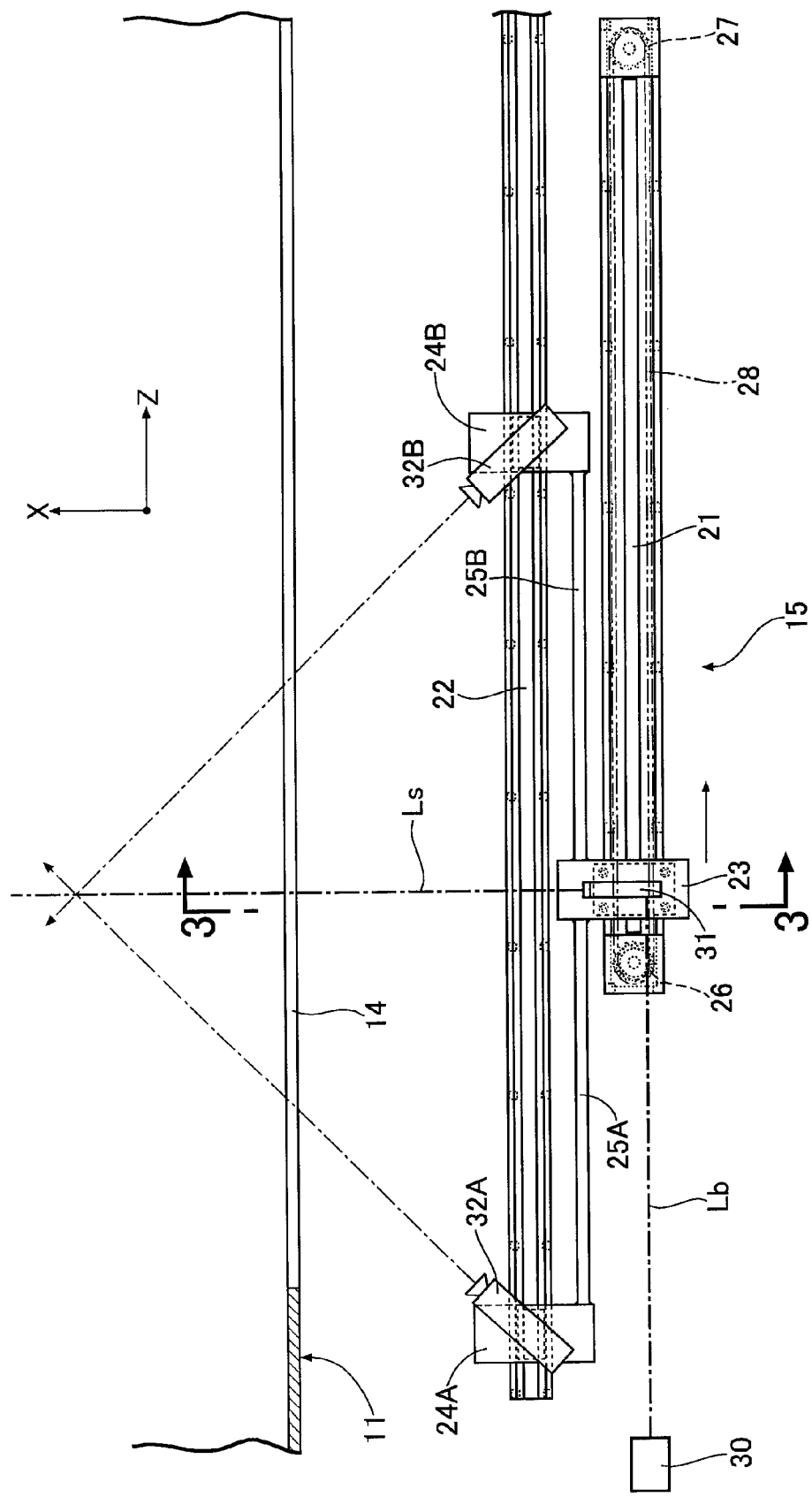
FIG. 2 is an enlarged view of part 2 in FIG. 1. (first embodiment)
Figure 3:
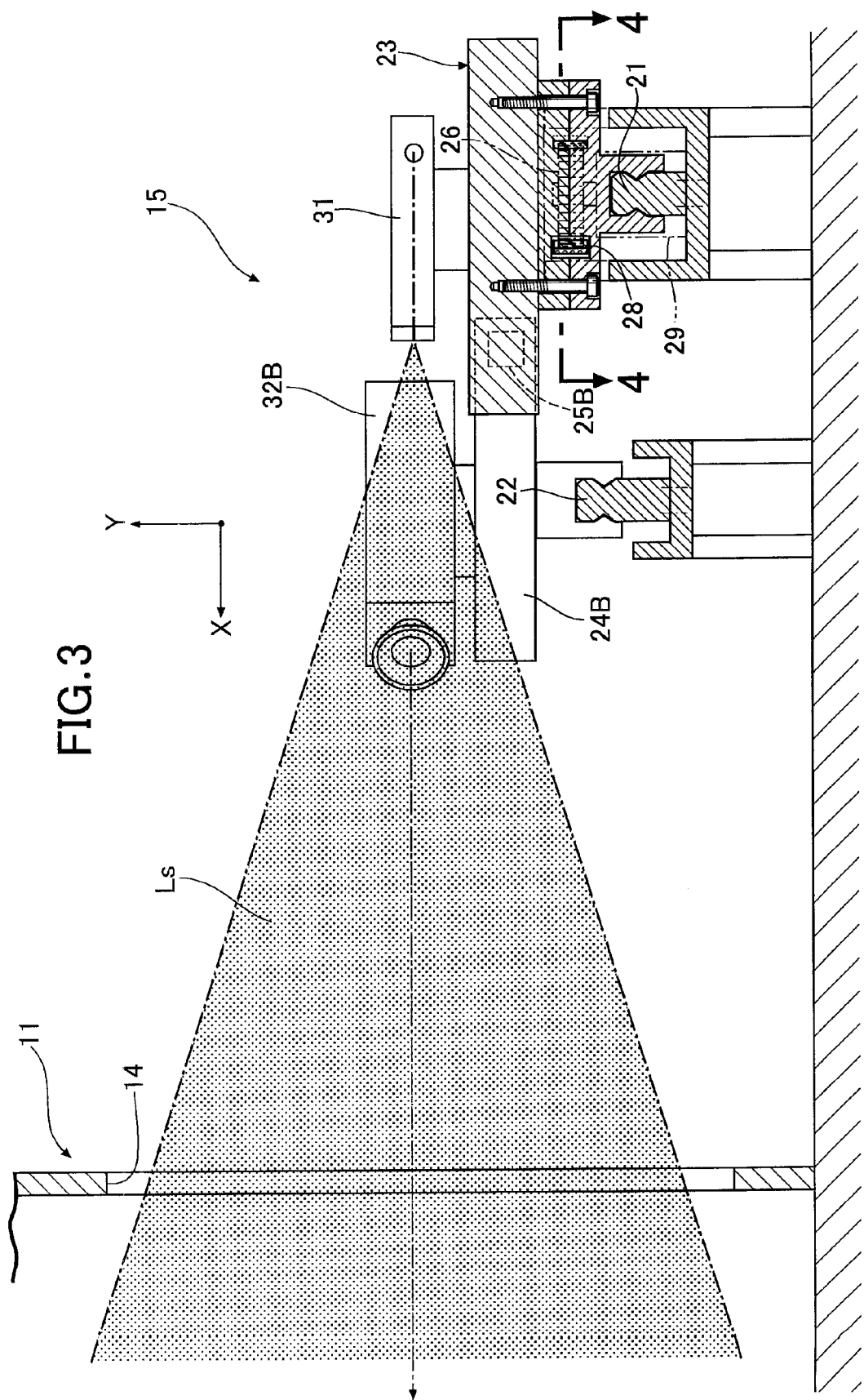
FIG. 3 is an enlarged sectional view along line 3-3 in FIG. 2. (first embodiment)
Figure 4:
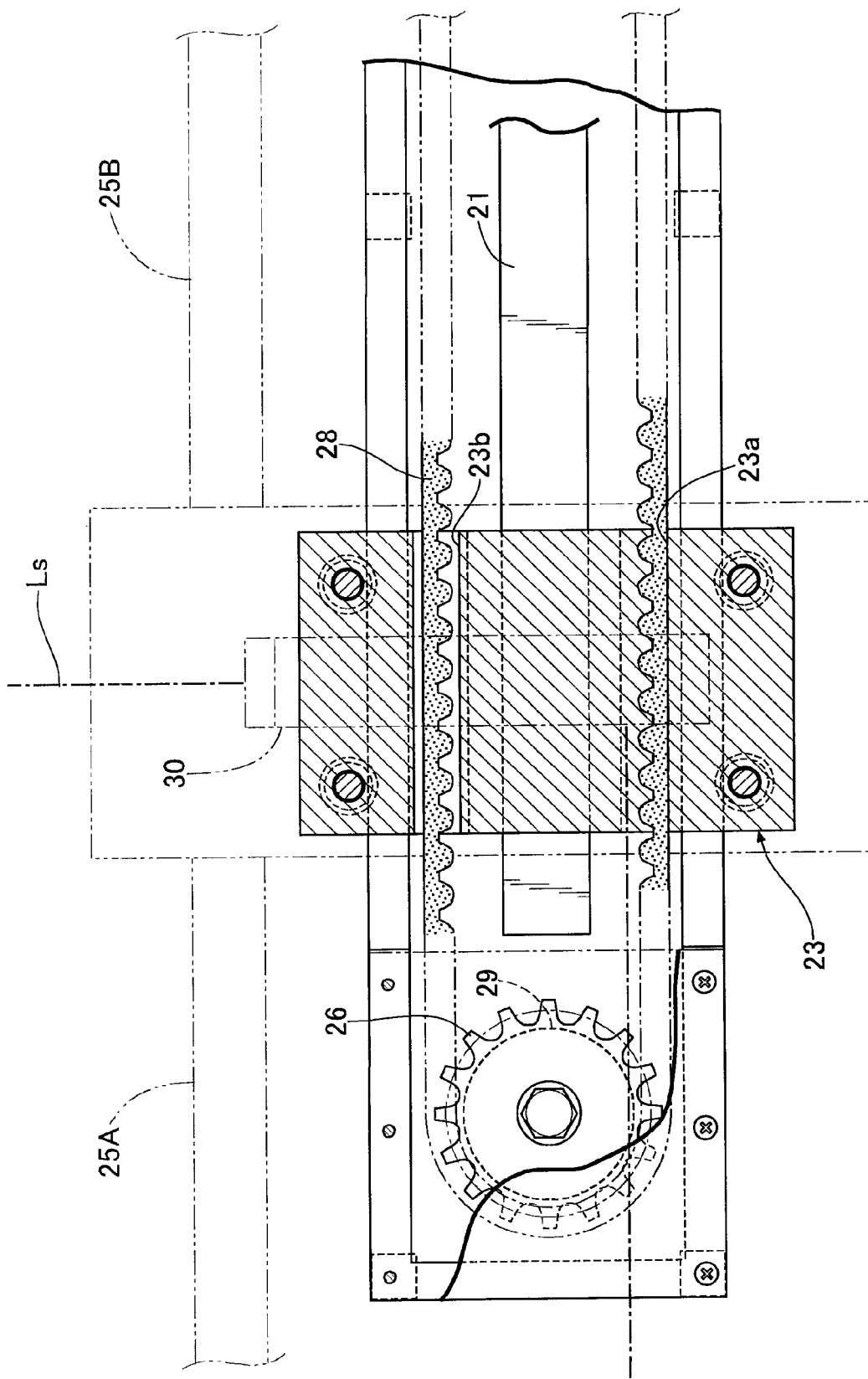
FIG. 4 is a sectional view along line 4-4 in FIG. 3. (first embodiment)
Figure 5:
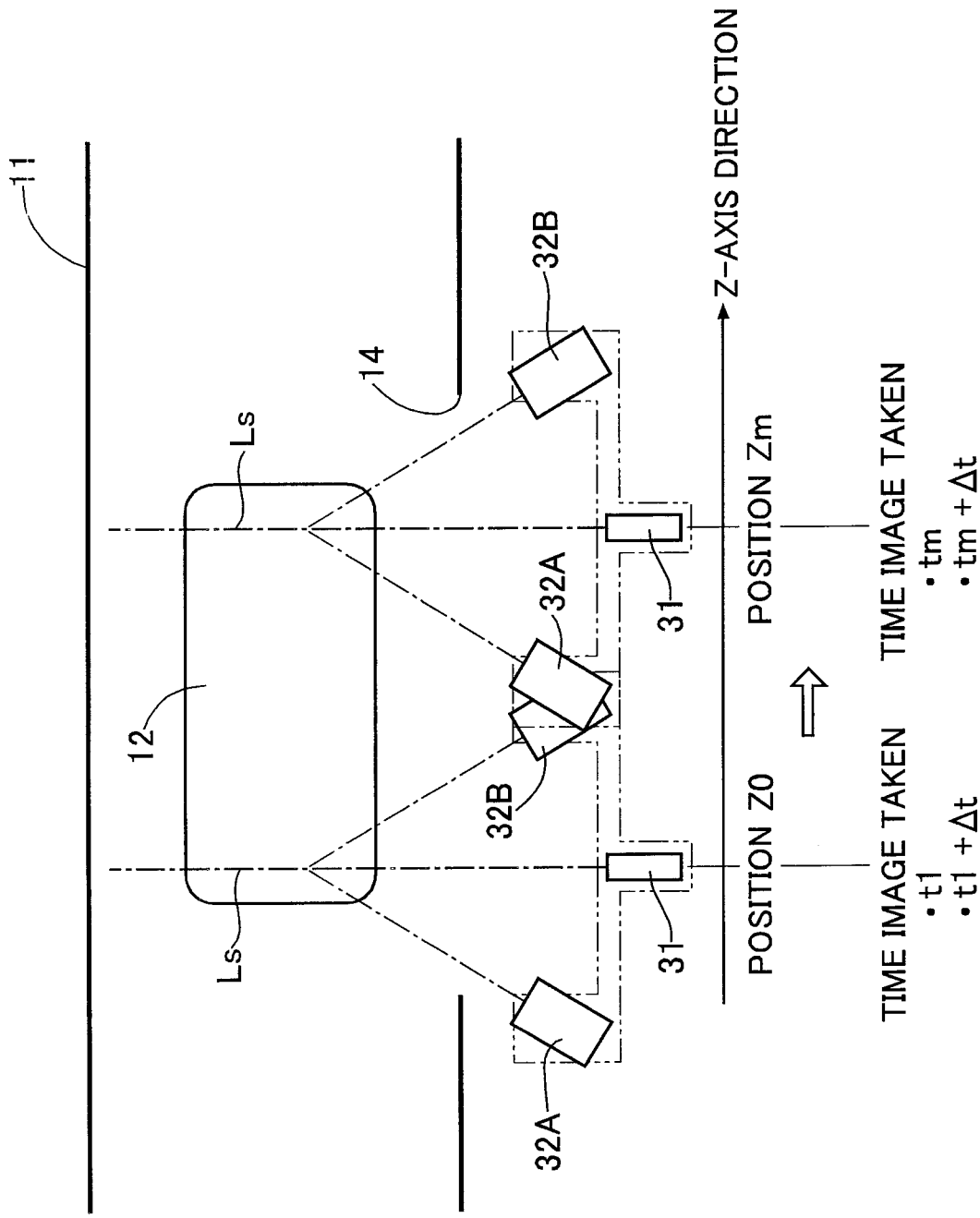
FIG. 5 is a diagram for explaining movement of a laser sheet and a CCD camera in the Z-axis direction. (first embodiment)

As shown in FIG. 2 to FIG. 4, the particle image velocimetry system 15 includes a main guide rail 21 disposed parallel to the axis of the wind tunnel 11, an auxiliary guide rail 22 disposed parallel to the main guide rail 21, a main traverser 23 movably supported on the main guide rail 21 and a pair of first and second auxiliary traversers 24A and 24B movably supported on the auxiliary guide rail 22, a first link rod 25A linking the main traverser 23 and the first auxiliary traverser 24A, and a second link rod 25B linking the main traverser 23 and the second auxiliary traverser 24B, the first and second link rods 25A and 25B having the same length.

An endless timing belt 28 is wound around a drive sprocket 26 and a driven sprocket 27 provided at opposite ends of the main guide rail 21, one chord section of the endless timing belt 28 engages with one through hole 23a of the main traverser 23 (see FIG. 4) in a relatively non-movable manner, and another chord section passes through another through hole 23b (see FIG. 4) of the main traverser 23 in a non-engaged manner. When the drive sprocket 26 is driven by a motor 29 (see FIG. 3 and FIG. 4), the timing belt 28 wound between it and the driven sprocket 27 rotates, and the main traverser 23 moves along the main guide rail 21. When the main traverser 23 moves, the first and second auxiliary traversers 24A and 24B linked thereto via the first and second link rods 25A and 25B move along the auxiliary guide rail 22.

A laser head 30 is provided on an extension line from the main guide rail 21, and the laser head 30 emits a laser beam Lb along the main guide rail 21. Laser sheet irradiating means 31, which is formed from a mirror and a cylindrical lens, is provided on an upper face of the main traverser 23, the laser sheet irradiating means 31 converting the laser beam Lb into a laser sheet Ls with which a plane perpendicular to the laser beam Lb is irradiated. The axes of the laser beam Lb and the wind tunnel 11 extend in the Z-axis direction, and the laser sheet Ls extends in the X-axis and Y-axis directions, which are perpendicular to the Z-axis direction.

First and second CCD cameras 32A and 32B are provided on upper faces of the first and second auxiliary traversers 24A and 24B respectively, the first and second CCD cameras 32A and 32B being disposed at mirror symmetrical positions with respect to the laser sheet Ls and directed to one point on the laser sheet Ls. The first and second CCD cameras 32A and 32B take an image of a predetermined region of the laser sheet Ls in the vicinity of the object 12, the first and second CCD cameras 32A and 32B being provided with a Scheimpflug adapter so that the entire area of the imaging region is focused. Since the main traverser 23 equipped with the laser sheet irradiating means 31 and the first and second auxiliary traversers 24A and 24B equipped with the first and second CCD cameras 32A and 32B move in the Z-axis direction while maintaining a constant positional relationship, the laser sheet Ls and the first and second CCD cameras 32A and 32B move in the Z-axis direction while maintaining a constant positional relationship.

The main traverser 23 and the first and second auxiliary traversers 24A and 24B move in the Z-axis direction intermittently by a predetermined distance at a time, and each time they stop the laser sheet Ls is shone twice with a short time interval Δt. In the embodiment, they move a distance of 1 m in the Z-axis direction intermittently at intervals of 10 cm (see FIG. 5). The higher the flow velocity of the uniform flow within the wind tunnel 11, the smaller the time interval Δt is set, and it is adjusted so that the distance of movement in the Z-axis direction of the tracer particles during the time interval Δt is at a level that is suitable for measurement. Furthermore, the distance of movement in the Z-axis direction of the tracer particles during the time interval Δt is set so that it does not exceed the thickness of the laser sheet Ls in the Z-axis direction.

The uniform flow flowing in the interior of the wind tunnel 11 changes its direction around the object 12 and becomes a three-dimensional flow, and the tracer particles contained therein also move along the line of flow of air. The first and second CCD cameras 32A and 32B take images of the tracer particles irradiated with the laser sheet Ls in synchronism with the first irradiation at time t1, thus acquiring two images from two directions of the tracer particles distributed within the irradiation plane. Similarly, the first and second CCD cameras 32A and 32B take images of the tracer particles irradiated with the laser sheet Ls in synchronism with the second irradiation at time t1'=t1+Δt, thus acquiring two images from two directions of the tracer particles distributed within the irradiation plane.

In the present embodiment, among various PIV methods, an 'image correlation method' is employed in which luminance patterns of two images acquired at the two times t1 and t1' are compared to determine the movement vector of a group of tracer particles.

Figure 6:
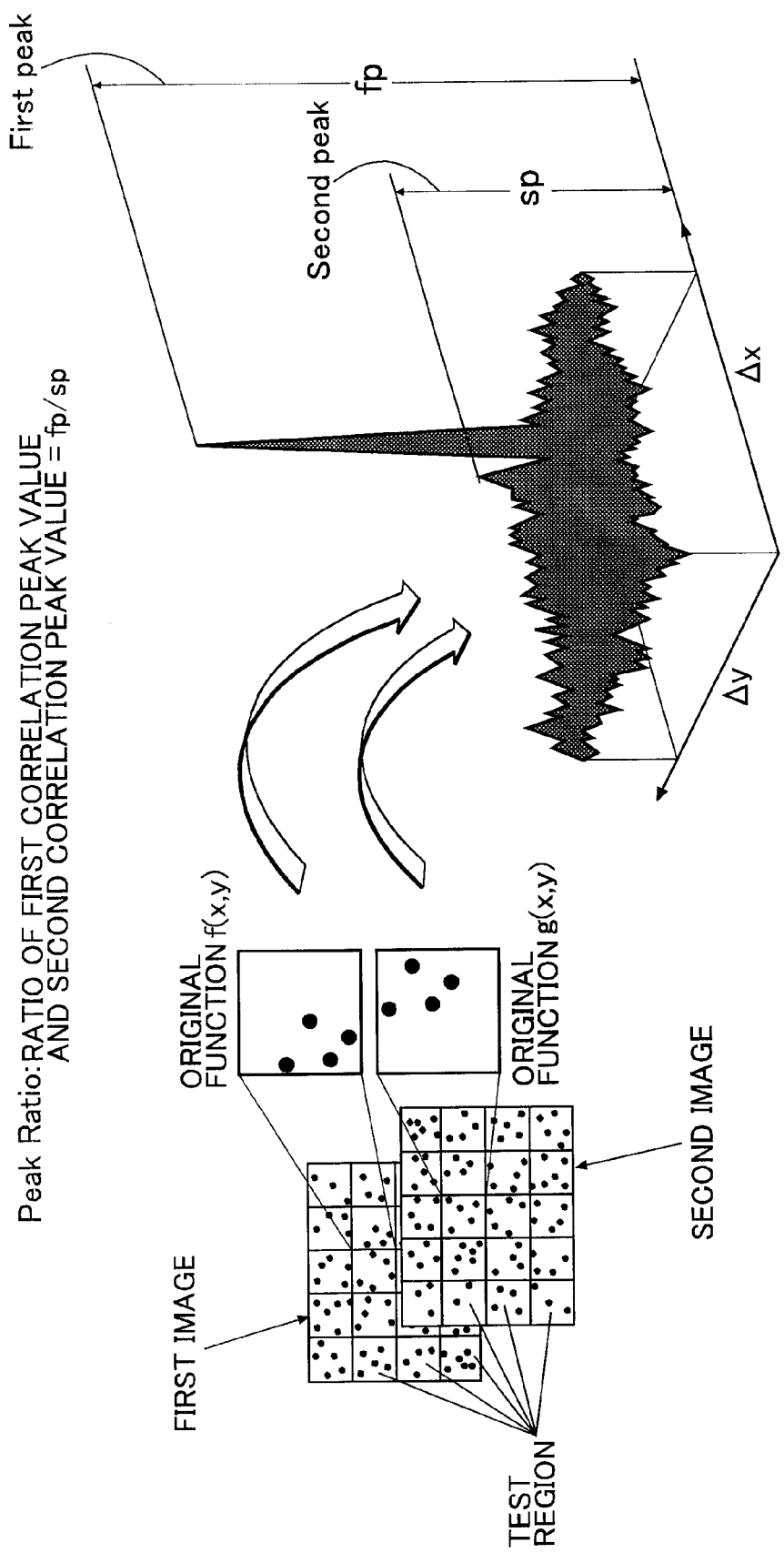
FIG. 6 is a diagram for explaining the process of calculating peak ratio from images at first and second times. (first embodiment)

FIG. 6 shows for example two images acquired at two times by the first CCD camera 32A. Since the axis of the first CCD camera 32A is inclined relative to the irradiation plane of the laser sheet Ls, the x-y plane of the image is inclined relative to the X-Y coordinates of the irradiation plane of the laser sheet Ls. The rectangular frame is one of the test regions formed by dividing the image of the first CCD camera 32A into a grid, and the movement vector within the x-y plane of the group of tracer particles in each test region is calculated. That is, the movement of the luminance pattern of the group of tracer particles in a predetermined test region of the first image acquired at time t1 to the position of the predetermined test region of the second image acquired at time t1' is detected using a cross-correlation value C (Δx, Δy), and the movement vector is divided by the time Δt, thus giving a two-component velocity vector in the test region. The process of calculating the two-component velocity vector is explained below.

First, the initial values of a first peak value fp and a second peak value sp are both set at 0.

$fp \leftarrow 0$ $sp \leftarrow 0$

Subsequently, the cross-correlation value C (Δx, Δy), which is defined by the following equation, is calculated.

$$C(\Delta x, \Delta y) = \Sigma_{x=p}^{np} \Sigma_{y=p}^{np} f(x,y) \cdot g(x+\Delta x, y+\Delta y)$$ [Equation 1]

Here, f(x, y) is a luminance function determined from the luminance pattern of the first image, and g(x, y) is a luminance function determined from the luminance pattern of the second image. Therefore, g(x+Δx, y+Δy) corresponds to one formed by moving the luminance distribution of g(x, y) in the x-axis direction by −Δx and in the y-axis direction by −Δy. Therefore, Δx and Δy correspond to the amounts of movement of the luminance pattern during the time interval Δt.

Each test region is a set of n square pixels having a side length of p in the x-axis direction and n square pixels having a side length of p in the y-axis direction, and the cross-correlation value C (Δx, Δy) is calculated while sweeping Δx from p to np and Δy from p to np. Each time the cross-correlation value C (Δx, Δy) exceeds the current first peak value fp, the cross-correlation value C (Δx, Δy) is defined as a new first peak value fp, and the current first peak value fp is defined as a new second peak value sp.

When the cross-correlation value C (Δx, Δy) is calculated in this way for all values of Δx and Δy, the values of Δx and Δy for which the final first peak value fp is obtained are defined as the amounts of movement of the luminance pattern from the first image to the second image. Values obtained by dividing Δx and Δy by the time interval Δt with which the first and second images are acquired are vx and vy, which are respectively the x component and the y component of the two-component velocity vector in the test region.

In this process, when the degree of correlation between the first image and the second image is high, the first peak value fp becomes outstandingly large and the second peak value sp is much smaller than the first peak value fp, whereas when the degree of correlation between the first image and the second image is low, the difference between the first peak value fp and the second peak value sp becomes small, and in such a case the reliability of a two-component velocity vector determined based on Δx and Δy becomes low.

In the present embodiment, the peak ratio fp/sp, which is the ratio of the first peak value fp and the second peak value sp, is calculated; if the peak ratio fp/sp is at least a threshold value of 1.2, that is, if the first peak value fp is at least 1.2 times the second peak value sp, it is determined that the reliability of the two-component velocity vector is high, whereas if the first peak value fp is less than 1.2 times the second peak value sp, it is determined that the reliability of the two-component velocity vector is low, and the two-component velocity vector is deleted as an erroneous vector.

Figure 7:
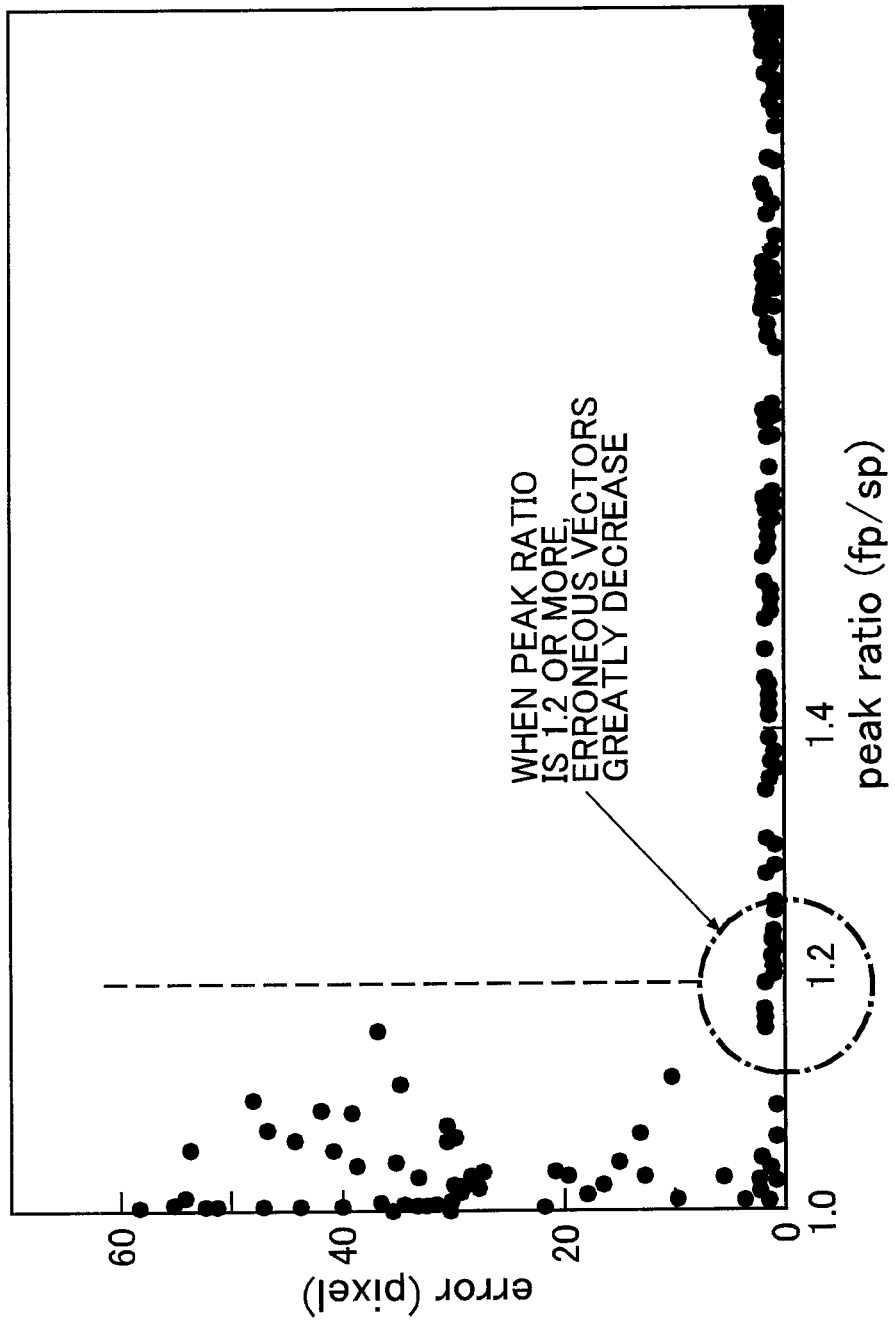
FIG. 7 is a diagram showing the relationship between the ratio of first and second peaks and the number of erroneous vectors. (first embodiment)

The abscissa of FIG. 7 is the peak ratio, and the ordinate is the number of erroneous vectors. It can be seen from this graph that the number of erroneous vectors is very small in the region where the peak ratio is at least 1.2 and the number of erroneous vectors rapidly increases in the region where the peak ratio is less than 1.2.

A method for calculating a, two-component velocity vector in each test region from two images acquired at two times t1 and t1' by the first CCD camera 32A is explained above, and in the same manner a three-component velocity vector in each test region may be calculated by comparing two images acquired at the two times t1 and t1' by the second CCD camera 32B.

A two-component velocity vector of a test region obtained from an image of the first CCD camera 32A and a two-component velocity vector of the test region obtained from an image of the second CCD camera 32B are different due to difference in the imaging direction of the first and second. CCD cameras 32A and 32B, that is, due to parallax caused by viewing an actual three-component velocity vector from different directions.

Therefore, calibration (correction) using the two two-component velocity vectors and the relative positional relationship between the first and second CCD cameras 32A and 32B relative to the laser sheet Ls can give a three-component velocity vector consisting of in-plane velocities (velocity Vx in X-axis direction and velocity Vy in Y-axis direction) and an out-of-plane velocity (velocity Vz in Z-axis direction) of the laser sheet Ls so as to correspond to each position of the irradiation plane.

When a three-component velocity vector within the irradiation plane of the laser sheet Ls is calculated as described above, by moving the main traverser 23 and the first and second auxiliary traversers 24A and 24B in the Z-axis direction while maintaining a fixed positional relationship, that is, by moving the laser sheet Ls and the first and second CCD cameras 32A and 32B in the Z-axis direction while maintaining a fixed positional relationship, an irradiation plane that is displaced in the Z-axis direction is irradiated with the laser sheet Ls, and a three-component velocity vector at each position of the new irradiation plane is calculated. In FIG. 1, a state in which an irradiation plane of the particle image velocimetry system 15 is at a position on the object 12 front end (upstream end) side is denoted by a solid line, and a state in which it is at a position on the object 12 rear end (downstream end) side is denoted by a dotted-dashed line.

By stacking in the Z-axis direction the results of carrying out this operation for a plurality of irradiation planes spaced in the Z-axis direction by a predetermined distance, a three-component velocity vector can be measured for the entirety of the three dimensional space around the object 12, and this enables a velocity field formed around the object 12 to be measured in detail.

Since images of the tracer particles distributed in the irradiation planes are acquired in sequence while moving the position of the laser sheet Ls in the Z direction along the axis, the times at which the images are acquired vary, but since measurement is carried out by defining the flow around the object as a steady flow, displacement of the time does not become a problem.

If the positions of the first and second CCD cameras 32A and 32B were fixed and only the laser sheet irradiating means 31 were moved in the Z-axis direction, the relative positional relationship to the first and second CCD cameras 32A and 32B would change accompanying movement of the laser sheet irradiating means 31, and calibration carried out when a three-component velocity vector was calculated from two two-component velocity vectors obtained from images of the first and second CCD cameras 32A and 32B would vary each time the position of the laser sheet Ls was moved, and there would be the problem that the number of calibration steps would increase.

However, in accordance with the present embodiment, since the laser sheet irradiating means 31 and the first and second CCD cameras 32A and 32B move in the Z-axis direction while maintaining a fixed positional relationship, it becomes unnecessary to carry out calibration each time the position of the laser sheet Ls moves, thus reducing the number of calibration steps.

Figure 8:
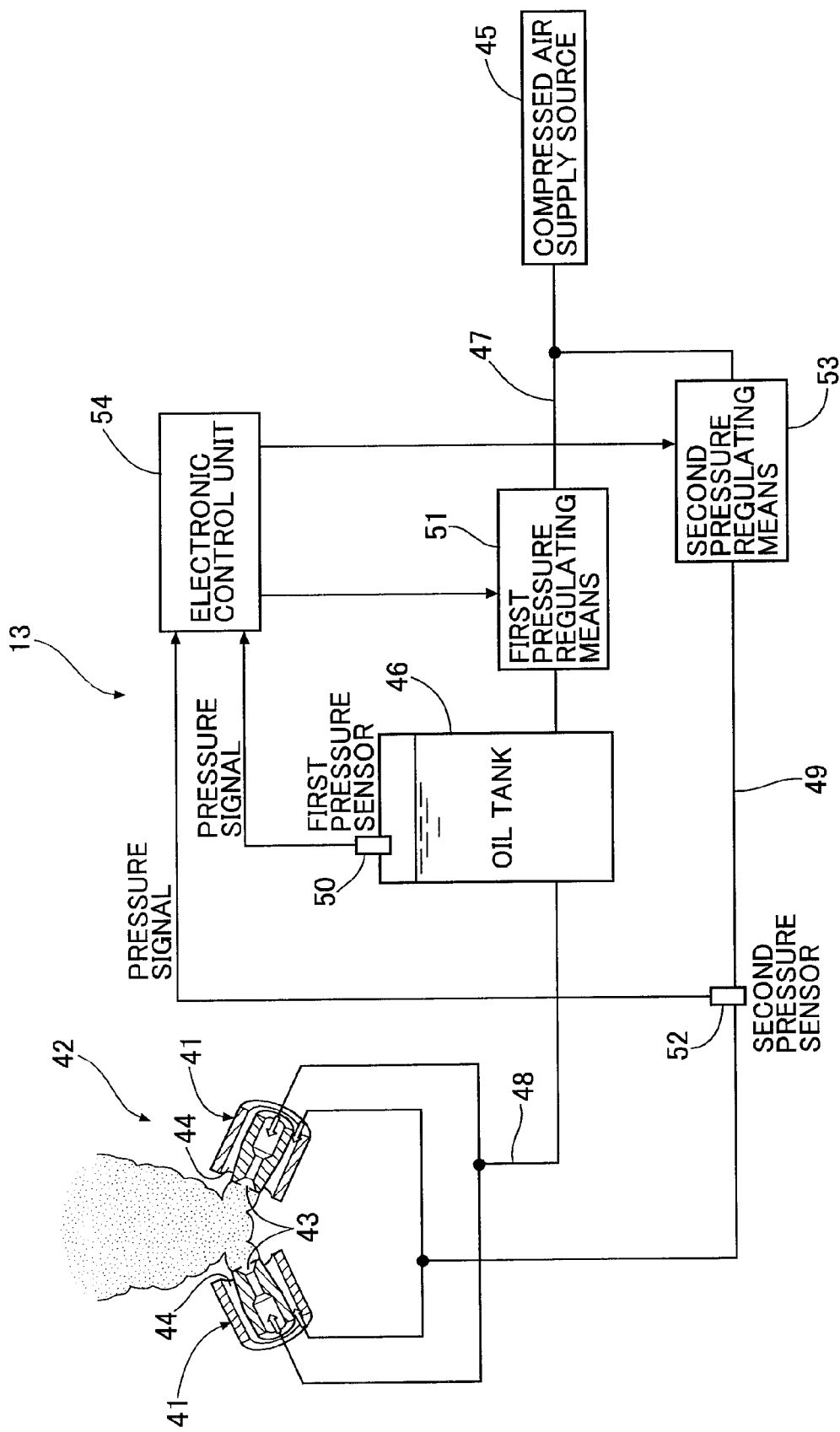
FIG. 8 is a diagram showing the structure of tracer particle supply means. (first embodiment)

The structure of the tracer particle supply means 13 is now explained by reference to FIG. 8.

The tracer particle supply means 13 includes an impinging jet type nozzle 42 in which two spray nozzles 41 and 41 are combined. The two spray nozzles 41 and 41 have substantially identical structures, include a central oil issuing opening 43 and an annular air issuing opening 44 surrounding the periphery of the oil issuing opening 43, and are disposed so that their axes intersect each other at an obtuse angle.

A compressed air supply source 45 for supplying compressed air and an oil tank 46 for storing oil (DOS) are connected via a first air passage 47, and the oil tank 46 and the oil issuing openings 43 and 43 of the two spray nozzles 41 and 41 are connected via an oil passage 48. Furthermore, the compressed air supply source 45 and the air issuing openings 44 and 44 of the two spray nozzles 41 and 41 are connected via a second air passage 49. Provided on the oil tank 46 is a first pressure sensor 50 and provided in the first air passage 47 on the upstream thereof is first pressure regulating means 51, which is a variable pressure control valve. Provided in the second air passage 49 is a second pressure sensor 52 and provided on the upstream thereof is second pressure regulating means 53.

An electronic control unit 54 controls operation of the first pressure regulating means 51 and the second pressure regulating means 53 based on pressure signals from the first pressure sensor 50 and the second pressure sensor 52.

Figure 9:
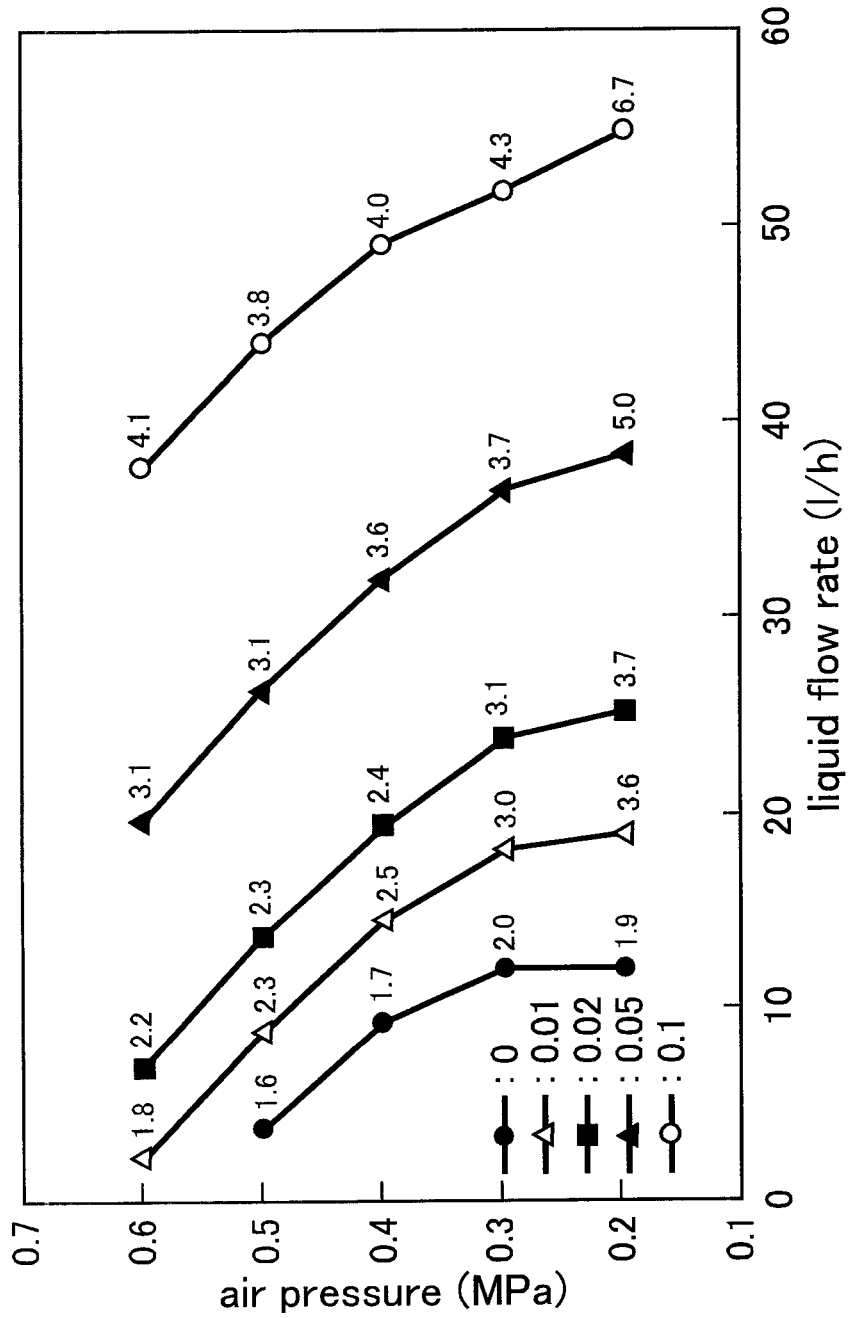
FIG. 9 is a diagram showing a map for looking up oil pressure and compressed air pressure from the particle size of tracer particles. (first embodiment)

FIG. 9 is a map showing the relationship between the pressure of compressed air supplied to the impinging jet type nozzle 42 (ordinate), the pressure of oil supplied to the impinging jet type nozzle 42 (see five characteristic lines), the flow rate of oil (abscissa), and the particle size of the tracer particles (see figure on each characteristic line). Use of this map enables the pressure of compressed air and the pressure of oil that give tracer particles having a desired particle size to be found.

For example, when the particle size of the tracer particles is desired to be 3.6 μm, the pressure of compressed air may be 0.4 MPa and the pressure of oil may be 0.05 MPa, and the flow rate of oil at that time is 32 liter/hour. Alternatively, when the pressure of compressed air is set at 0.2 MPa and the pressure of oil is set at 0.01 MPa, the particle size of the tracer particles can be set at 3.6 μm, and the flow rate of oil at that time decreases to 19 liter/hour.

When the pressure of compressed air and the pressure of oil in order to obtain a target particle size of tracer particles are looked up on the map of FIG. 9 as described above, the electronic control unit 54 of FIG. 8 carries out feedback control of operation of the first pressure regulating means 51 so that the pressure of oil detected by the first pressure sensor 50 coincides with the map value, and carries out feedback control of operation of the second pressure regulating means 53 so that the pressure of air detected by the second pressure sensor 52 coincides with the map value, thereby stably generating tracer particles having the target particle size from the impinging jet type nozzle 42.

Figure 10:
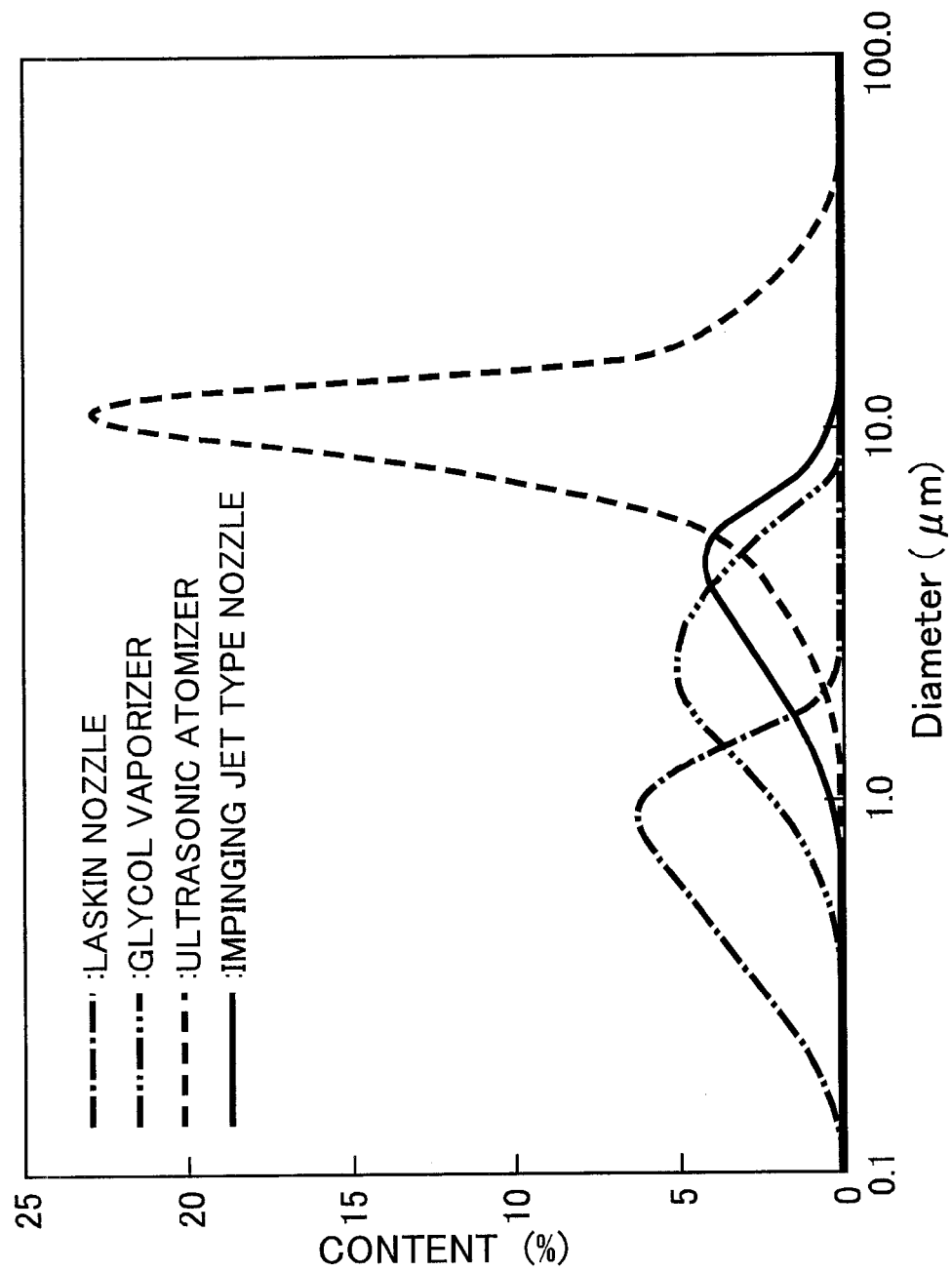
FIG. 10 is a graph showing particle size and content of tracer particles of various types of tracer particle supply means. (first embodiment)

As shown in FIG. 10, tracer particles from a Laskin nozzle have the problem that although the particle size is uniform the particle size is small, tracer particles from a Glycol vaporizer have the problem that particle lifetime is short and control of particle concentration is difficult, and tracer particles from an ultrasonic atomizer have the problem that the particle size is large and uniform but oil (DOS) cannot be used and the particle lifetime is short.

On the other hand, in accordance with the present embodiment, tracer particles can be generated by using oil (DOS) and, moreover, the tracer particles have a large particle size and are free from the problem of adhering to the surface of the object 12 due to the size being too large. Furthermore, it is possible to easily control the particle size by changing the air pressure and the oil pressure.

Figure 11:
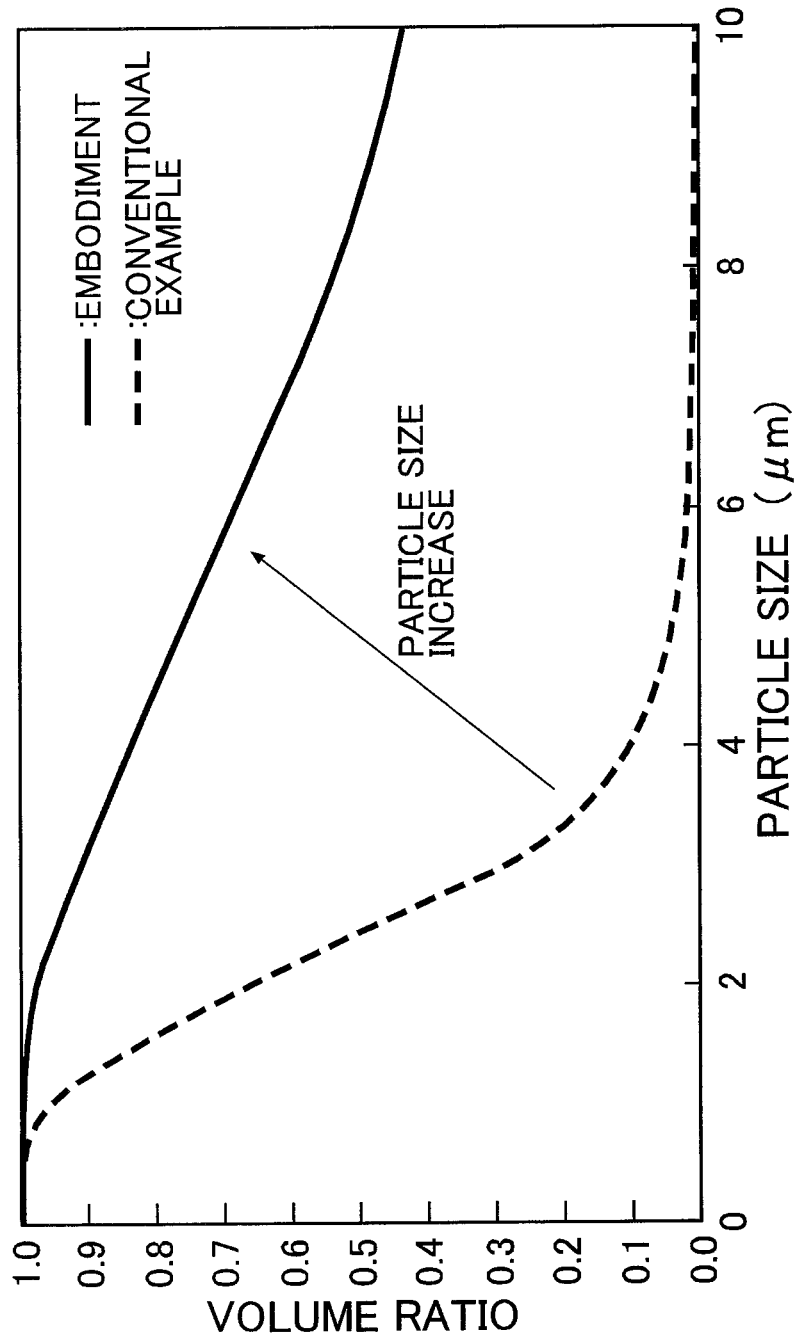
FIG. 11 is a diagram for comparing the particle size of tracer particle supply means of an embodiment and a conventional example. (first embodiment)

FIG. 11 shows the relationship between particle size of tracer particles and volume ratio of the tracer particles having this particle size, and it can be seen that in accordance with the present embodiment, the proportion of tracer particles having a large particle size increases compared with a conventional example.

TABLE 1

| NOZZLE | FLUID PRESSURE [MPa] | AIR PRESSURE [MPa] | D10 [μm] | D32 [μm] |
|---|---|---|---|---|
| LASKIN NOZZLE | NA | 0.2 | 1.1 | 3.6 |
| IMPINGING JET TYPE NOZZLE | 0 | 0.5 | 1.8 | 6.9 |
| | 0 | 0.6 | 1.8 | 6.7 |
| | 0.05 | 0.5 | 3.1 | 13.7 |
| | 0.05 | 0.6 | 3.1 | 13.1 |
| | 0.1 | 0.5 | 3.7 | 17.1 |
| | 0.1 | 0.6 | 3.1 | 15.6 |

D10: ARITHMETIC MEAN DIAMETER
D32: SAUTER MEAN DIAMETER

Furthermore, Table 1 shows the results of calculation by arithmetic mean diameter (D10) and Sauter mean diameter (D32) of the particle size of tracer particles from the Laskin nozzle (fluid pressure: NA, air pressure: 0.2 MPa) and the particle size of tracer particles in accordance with the present embodiment in which the fluid pressure and air pressure were varied. It can also be seen from Table 1 that the particle size of tracer particles in accordance with the present embodiment exceeds the particle size of tracer particles from the Laskin nozzle.

Figure 12:
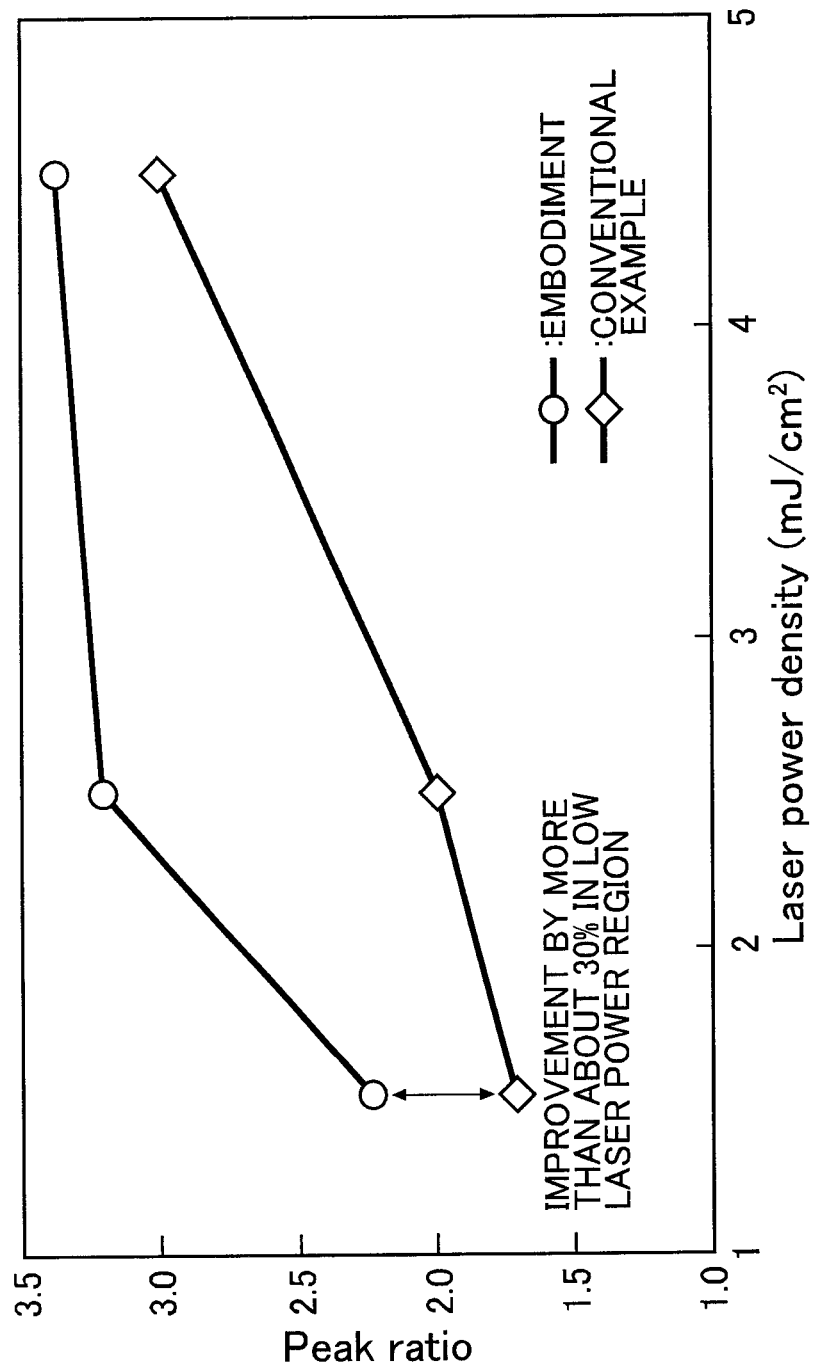
FIG. 12 is a diagram for comparing the relationship of peak ratio with respect to laser intensity of the embodiment and the conventional example. (first embodiment)

FIG. 12 shows the relationship between intensity of laser light and peak ratio, and it can be seen that even in a region where the intensity of laser light is low the peak ratio of the present embodiment exceeds the peak ratio of the conventional example by about 30%.

Figure 13A:
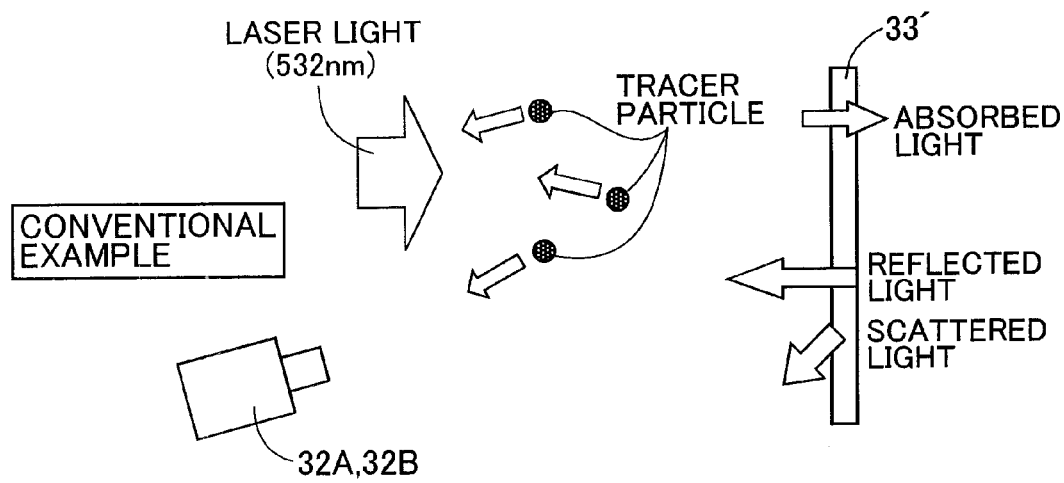
FIG. 13A is a diagram for explaining light reflected from a normal coating. (first embodiment)
Figure 13B:
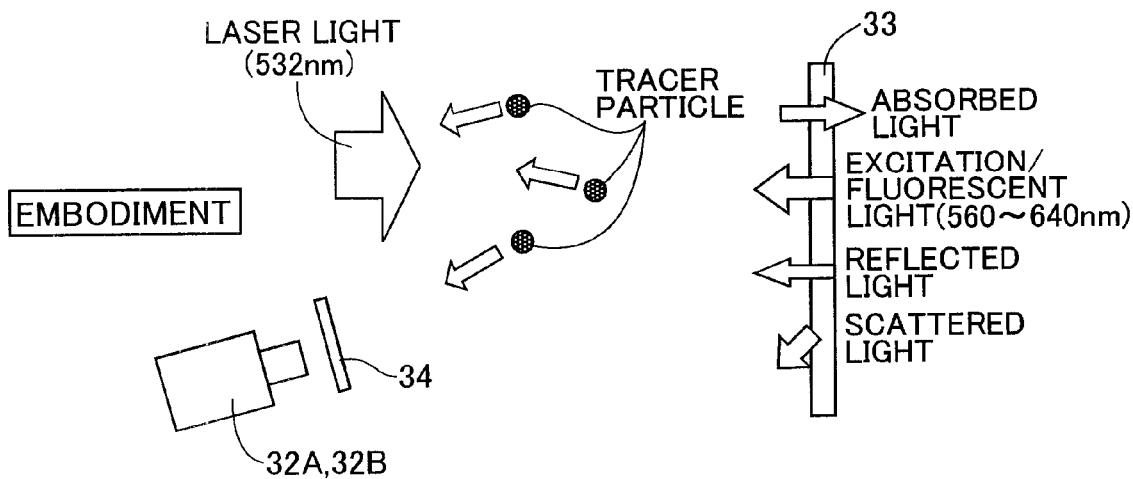
FIG. 13B is a diagram for explaining light reflected from a fluorescent coating. (first embodiment)

As shown in FIG. 13B, in the present embodiment the surface of the object 12 is coated with a coating 33 having fluorescent properties, and the coating 33 is excited with laser light having a wavelength of 532 nm emitted from the laser light irradiating means 31, thus giving fluorescence having a wavelength of 560 nm to 640 nm. Filters 34 and 34 that selectively pass laser light at a wavelength of 532 nm are fitted in front of the first and second CCD cameras 32A and 32B.

In a conventional example shown in FIG. 13A, the surface of the object 12 is coated with a normal paint; when the coating 33' is irradiated with laser light, part thereof is absorbed as absorbed light, another part is reflected as reflected light, and the remaining part is reflected as scattered light. Therefore, images of the reflected light part and the scattered light part are taken by the first and second CCD cameras 32A and 32B together with an image of light reflected from the tracer particles, thus causing a decrease in the S/N ratio.

In the present embodiment shown in FIG. 13B, the surface of the object 12 is coated with the fluorescent coating 33, the coating 33 is excited by irradiation with laser light and emits fluorescence as reflected light. Since, in this process, the wavelength of reflected light changes to 560 nm to 640 nm with respect to a wavelength of 532 nm of laser light used for irradiation, the intensities of reflected light and scattered light are decreased by a portion corresponding to the generated fluorescence.

With regard to laser light having a wavelength of 532 nm emitted by the laser sheet irradiating means 31, part thereof is absorbed as absorbed light, another part is reflected as reflected light having a wavelength of 532 nm, a remaining part is reflected as scattered light having a wavelength of 532 nm, and another remaining part becomes reflected light (fluorescence) for which the wavelength has changed to 560 nm to 640 nm. The majority of the reflected light (fluorescence) having a wavelength of 560 nm to 640 nm is filtered when passing through the filters 34 and 34 in front of the first and second CCD cameras 32A and 32B, and images of only the reflected light part whose wavelength is still 532 nm and the scattered light part are taken by the first and second CCD cameras 32A and 32B.

In the present embodiment, since the intensities of the reflected light and the scattered light are weakened by a portion corresponding to the change of part of the laser light into fluorescent light, the noise from the object 12 imaged by the first and second CCD cameras 32A and 32B becomes smaller compared with a conventional technique, a clear image of tracer particles can be obtained by increasing the S/N ratio of the image of the tracer particles, and it becomes possible to detect a three-dimensional velocity vector in the interior of the laser sheet Ls with good precision.

Figure 14A:
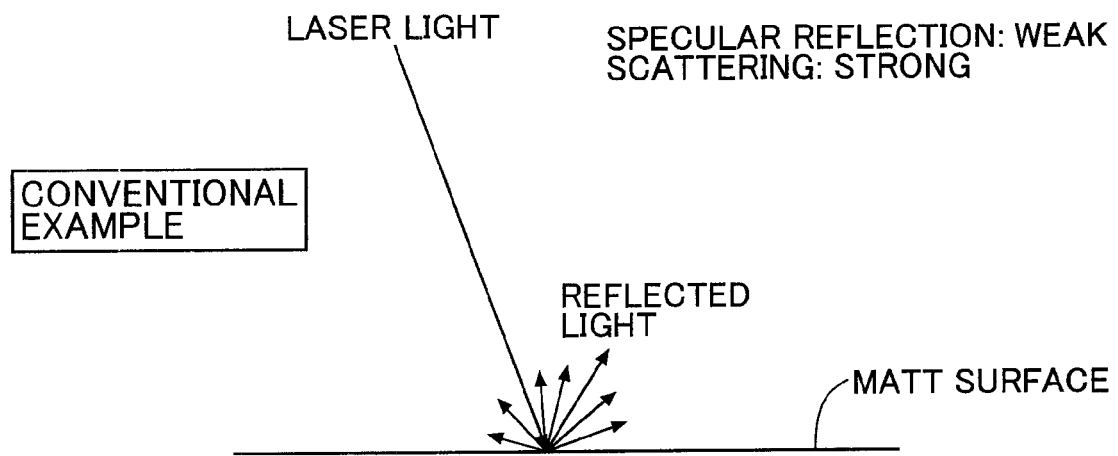
FIG. 14A is a diagram for explaining light reflected from a rough surface. (first embodiment)

Furthermore, as in the conventional example shown in FIG. 14A, if the surface of the coating 33' of the object 12 is in a matt (rough surface) state, hardly any laser light is specularly reflected, the majority being scattered, and part of the scattered light is always imaged by the first and second CCD cameras 32A and 32B, thereby giving rise to the problem that the S/N ratio of an image of tracer particles becomes low.

Figure 14B:
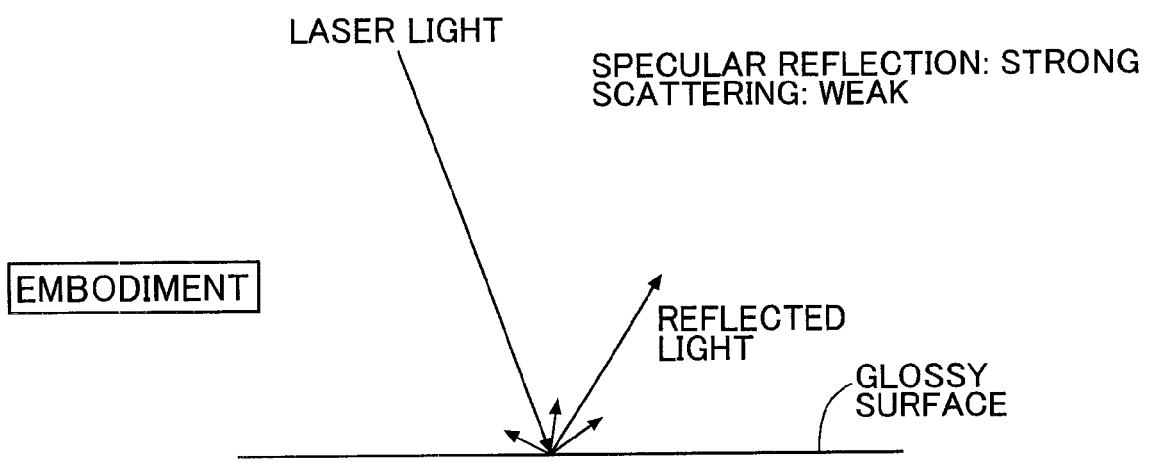
FIG. 14B is a diagram for explaining light reflected from a smooth surface. (first embodiment)

On the other hand, in the present embodiment shown in FIG. 14B, since the surface of the coating 32 of the object 12 is in a glossy (smooth surface) state, hardly any laser light is scattered but the majority thereof is specularly reflected; in order that the specularly reflected laser light is not imaged by the first and second CCD cameras 32A and 32B, the positions of the first and second CCD cameras 32A and 32B are adjusted so as to be at a position where the reflected light is not directly imaged, and it is thereby possible to further increase the S/N ratio of the image of the tracer particles.

As hereinbefore described, in accordance with the present embodiment, since fluorescence is imparted to the coating 33 with which the object 12 is coated, it is possible to prevent any adverse effects on the human body due to diffusion of tracer particles containing a harmful fluorescent material and, moreover, since it is unnecessary to impart fluorescence to the tracer particles themselves, it is possible to prevent any degradation in the ability of tracer particles to follow a flow field due to an increase in their weight.

An embodiment of the present invention is explained above, but the present invention may be modified in a variety of ways as long as the modifications do not depart from the spirit and scope thereof.

For example, in the embodiment an erroneous vector is determined based on first and second peak values fp and sp calculated from cross-correlation values C(Δx, Δy) of two images using a direct cross-correlation method, but it is also possible to employ a correlation method, other than the direct cross-correlation method, such as an FFT cross-correlation method or a self correlation method.

Furthermore, in the embodiment stereo PIV employing the first and second CCD cameras 32A and 32B is used, but the present invention may be applied to PIV employing one CCD camera.

Moreover, in the embodiment the laser sheet irradiating means 31 is supported on the main traverser 23 and the first and second CCD cameras 32A and 32B are supported on the first and second auxiliary traversers 24A and 24B respectively, but the laser sheet irradiating means 31 and the first and second CCD cameras 32A and 32B may be supported on a common traverser.

Furthermore, the drive means for the traverser is not limited to the drive sprocket 26, the driven sprocket 27, and the timing belt 28, and any means such as a rack-and-pinion mechanism or a pole screw mechanism may be employed.

Moreover, the direction of the laser beam emitted from the laser head 30 may be changed via an optical system such as a mirror for finely adjusting the optical axis and then emitted parallel to the guide members 21 and 22.

Furthermore, in the embodiment fluorescent properties are imparted to the coating 33 with which the surface of the object 12 is coated, but the surface of an object may be covered with a film or tape having fluorescent properties.

Moreover, in the embodiment the first and second pressure regulating means 51 and 53 are formed from variable pressure control valves, but they may be formed from a combination of a regulator on the upstream side and an open/close valve on the downstream side.

Furthermore, in the embodiment the first pressure regulating means 51 is provided in the first air passage 47, but it may be provided in the oil passage 48, and in this case the first pressure sensor 50 is provided in the oil passage 48 on the downstream side of the first pressure regulating means 51.

The invention claimed is:

1. A particle image velocimetry method comprising supplying tracer particles to a flow field around an object from tracer particle supply means, taking an image of reflected light by imaging means by irradiating the tracer particles twice with laser light at different times and different positions of the imaging means relative to the flow field, and determining a velocity vector of the flow field based on the two images obtained of the tracer particles, wherein the two images are each divided into a plurality of test regions, and the reliability of the velocity vector is determined by comparison between a first peak value (fp) and a second peak value (sp) of a cross-correlation value of a luminance pattern of tracer particles in each test region of the two images, and wherein when the first peak value (fp)/the second peak value (sp)≥1.2 is satisfied, it is determined that the reliability of the velocity vector is high.

2. A particle image velocimetry method for three dimensional space comprising irradiating tracer particles contained in a flow field around an object with a two-dimensional laser sheet at two times spaced by a very small period of time, taking an image of irradiated tracer particles by imaging means from two directions that intersect the laser sheet, and measuring two in-plane velocity components (Vx, Vy) of tracer particles within the laser sheet and one out-of-plane velocity component (Vz) that is perpendicular to the laser sheet based on the obtained images at the two times, wherein the method comprises a step of acquiring the three velocity components (Vx, Vy, Vz) within a plurality of planes that are spaced in a direction perpendicular to the laser sheet, and a step of measuring the velocity field of the three velocity components (Vx, Vy, Vz) in three dimensional space by stacking the three velocity components (Vx, Vy, Vz) within the plurality of planes using the flow as a steady flow.

3. The particle image velocimetry method for three dimensional space according to claim 2, wherein laser sheet irradiating means and the imaging means are supported on a moving member that can be moved along a guide member disposed in a direction parallel to a laser beam generating the laser sheet, and the laser sheet irradiating means and the imaging means are moved while maintaining a fixed positional relationship.

4. The particle image velocimetry method for three dimensional space according to claim 3, further comprising, fixed outside the movement means, a laser head that emits the laser beam in a direction parallel to the direction of movement of the movement means, the laser sheet irradiating means converting the laser beam into the laser sheet.

5. A particle image velocimetry system in which tracer particles contained in a flow field around an object are irradiated with laser light having a predetermined wavelength, an image of reflected light is taken by imaging means, and the flow velocity of the flow field is measured based on the image obtained of the tracer particles, wherein the object has a fluorescent surface that changes the wavelength of incoming laser light and reflects the laser light, and the imaging means takes an image of light reflected from the tracer particles through a filter that selectively passes the predetermined wavelength.

6. The particle image velocimetry system according to claim 5, wherein the surface of the object is a smooth glossy surface.

7. A tracer particle generating device in a particle image velocimetry system, the particle image velocimetry system being configured such that it supplies tracer particles formed from fine oil particles from tracer particle supply means to a flow field around an object, takes an image of reflected light with imaging means by irradiating the tracer particles with laser light, and measures the state of the flow field based on the images obtained of the tracer particles, wherein the tracer particle supply means comprises an impinging jet type nozzle having two spray nozzles with axes thereof intersecting each other, the spray nozzle surrounding a periphery of an oil issuing opening that issues oil with an air issuing opening that issues air, a compressed air supply source for supplying compressed air, an oil tank for storing oil, a first air passage for pressurizing oil by supplying air of the compressed air supply source to the oil tank, an oil passage for supplying pressurized oil of the oil tank to two oil issuing openings of the impinging jet type nozzle, and a second air passage for supplying air of the compressed air supply source to two air issuing openings of the impinging jet type nozzle.

8. The tracer particle generating device in a particle image velocimetry system according to claim 7, further comprising first pressure regulating means provided in at least one of the first air passage and the oil passage, a first pressure sensor provided downstream of the first pressure regulating means, second pressure regulating means provided in the second air passage, a second pressure sensor provided downstream of the second pressure regulating means, and control means for controlling the first pressure regulating means based on a pressure detected by the first pressure sensor and controlling the second pressure regulating means based on a pressure detected by the second pressure sensor.

* * * * *